United States Patent
Blais et al.

(10) Patent No.: US 12,079,671 B2
(45) Date of Patent: Sep. 3, 2024

(54) EFFICIENT DIRECTED CONTENT IN PUB/SUB SYSTEMS

(71) Applicant: Raytheon BBN Technologies Corp., Cambridge, MA (US)

(72) Inventors: Stéphane Yannick Blais, Framingham, MA (US); Michael Hassan Atighetchi, Framingham, MA (US); Samuel Cunningham Nelson, Sudbury, MA (US); Christopher Lawrence Willig, Chelmsford, MA (US)

(73) Assignee: RAYTHEON BBN TECHNOLOGIES CORP., Cambridge, MA (US)

( * ) Notice: Subject to any disclaimer, the term of this patent is extended or adjusted under 35 U.S.C. 154(b) by 85 days.

(21) Appl. No.: 17/822,628

(22) Filed: Aug. 26, 2022

(65) Prior Publication Data
US 2024/0069990 A1 Feb. 29, 2024

(51) Int. Cl.
G06F 9/54 (2006.01)
(52) U.S. Cl.
CPC .................... G06F 9/546 (2013.01)
(58) Field of Classification Search
None
See application file for complete search history.

(56) References Cited

U.S. PATENT DOCUMENTS

| | | | | |
|---|---|---|---|---|
| 2004/0019637 A1* | 1/2004 | Goodman | ............... | H04L 51/02 709/204 |
| 2005/0021836 A1* | 1/2005 | Reed | ....................... | G06F 9/542 709/204 |
| 2012/0239756 A1* | 9/2012 | Surendranath | .......... | G06F 9/542 709/206 |
| 2013/0325960 A1* | 12/2013 | Agarwal | ................. | H04L 67/02 709/204 |
| 2016/0087923 A1* | 3/2016 | Kesavan | ................. | H04L 51/08 709/206 |
| 2016/0219089 A1* | 7/2016 | Murthy | ................... | H04L 51/58 |

OTHER PUBLICATIONS

Zanikolas et al. "A taxonomy of grid monitoring systems" Jan. 2005 Future Generation Computer Systems vol. 21 pp. 163-188.*

* cited by examiner

*Primary Examiner* — Charles E Anya
(74) *Attorney, Agent, or Firm* — CANTOR COLBURN LLP

(57) ABSTRACT

Techniques are described herein for a messaging system to allow publishers that are aware of the identities of their respective subscribers to target content at those subscribers directly. This may be accomplished by allowing users and other targets (e.g., groups) to register their identities at particular computing nodes of a system. Then publishers (e.g., applications) may send out messages targeted at particular identities, and a publishing system may forward messages to appropriate nodes based on which identities are registered at those nodes. Legacy applications that are not able to target particular identities may instead connect to application adapters that are configured to learn which identities should be targeted by each application. In addition, anonymized identities may be used for application messages that need to cross between domains having differing security levels.

14 Claims, 6 Drawing Sheets

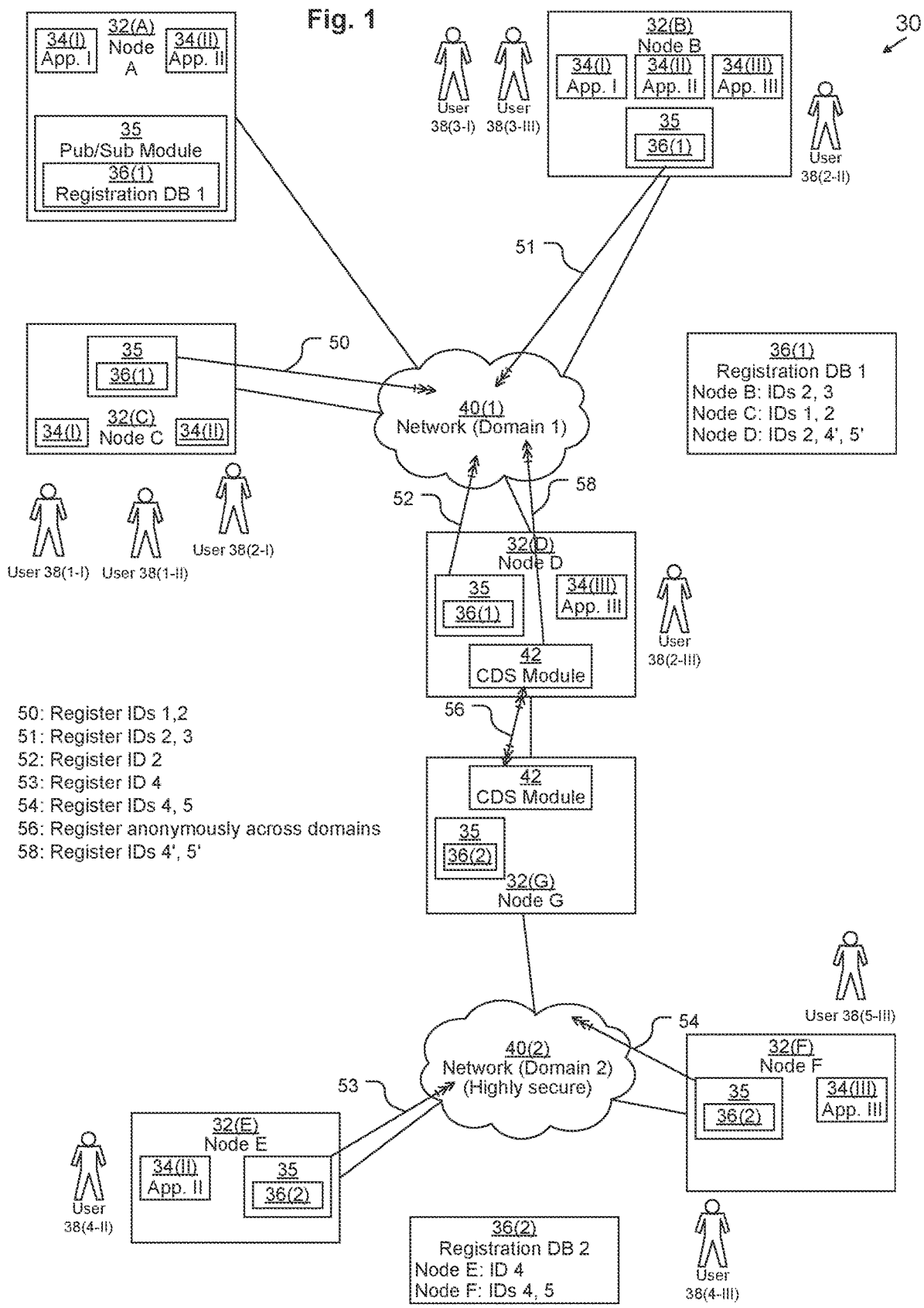

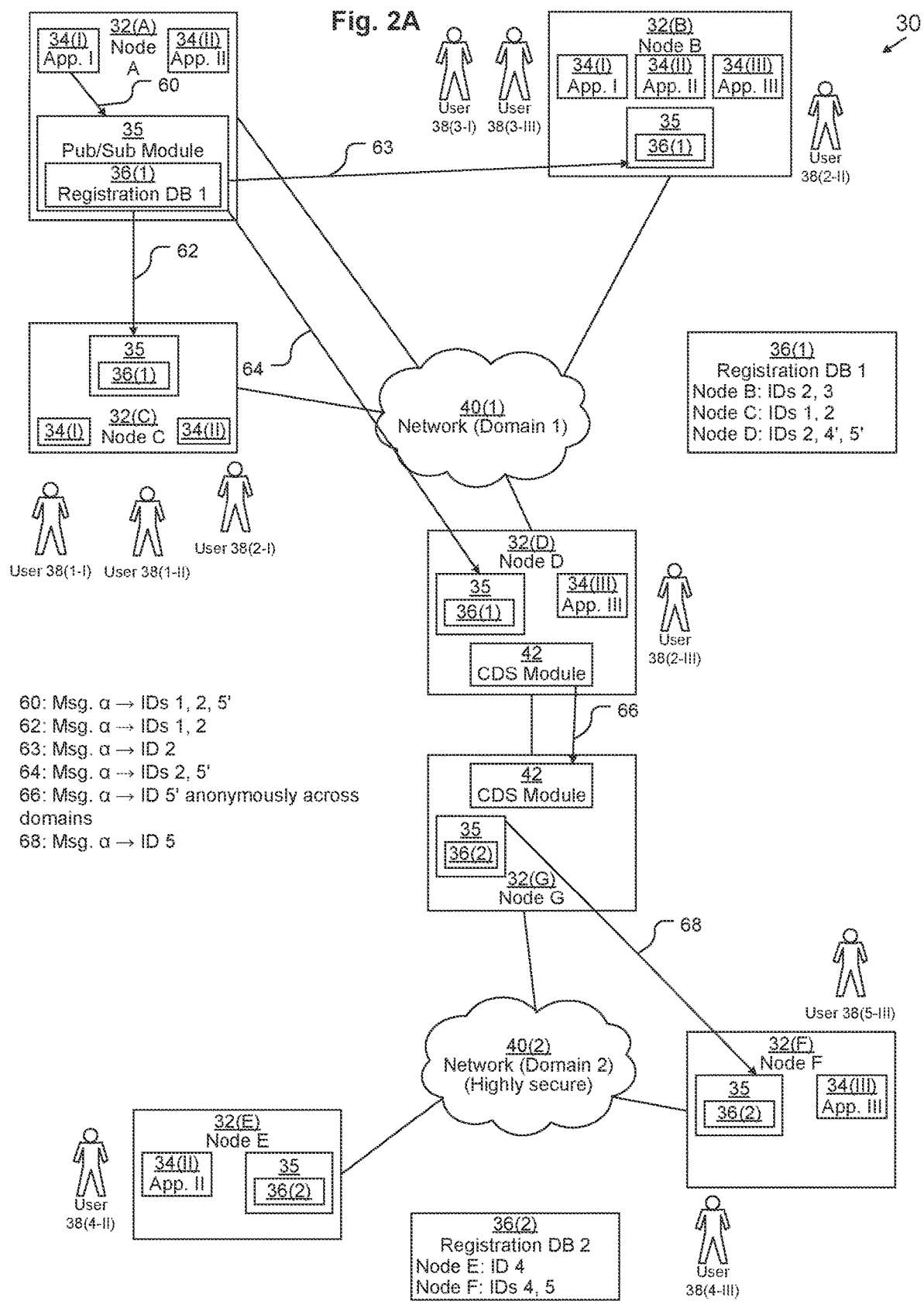

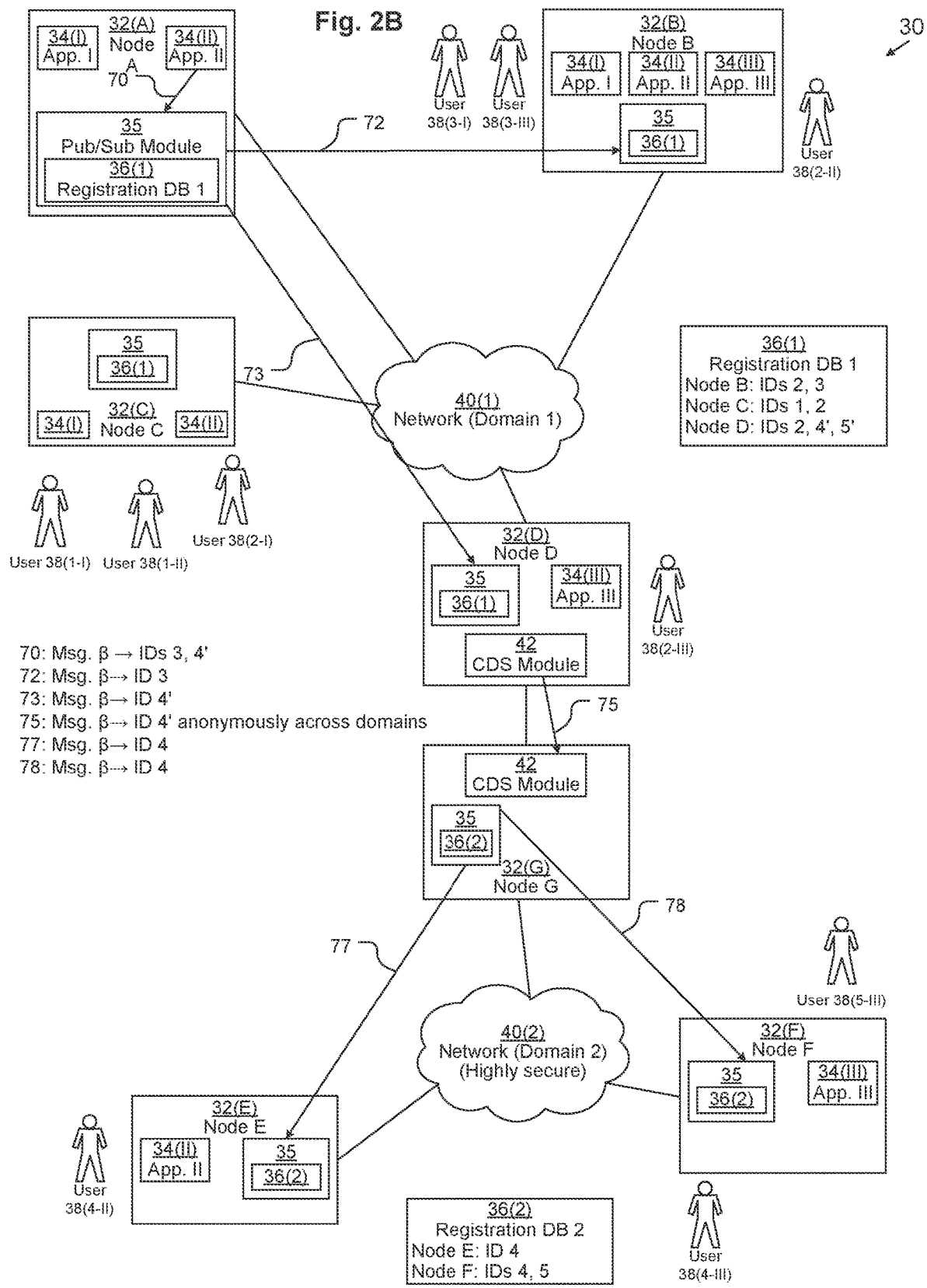

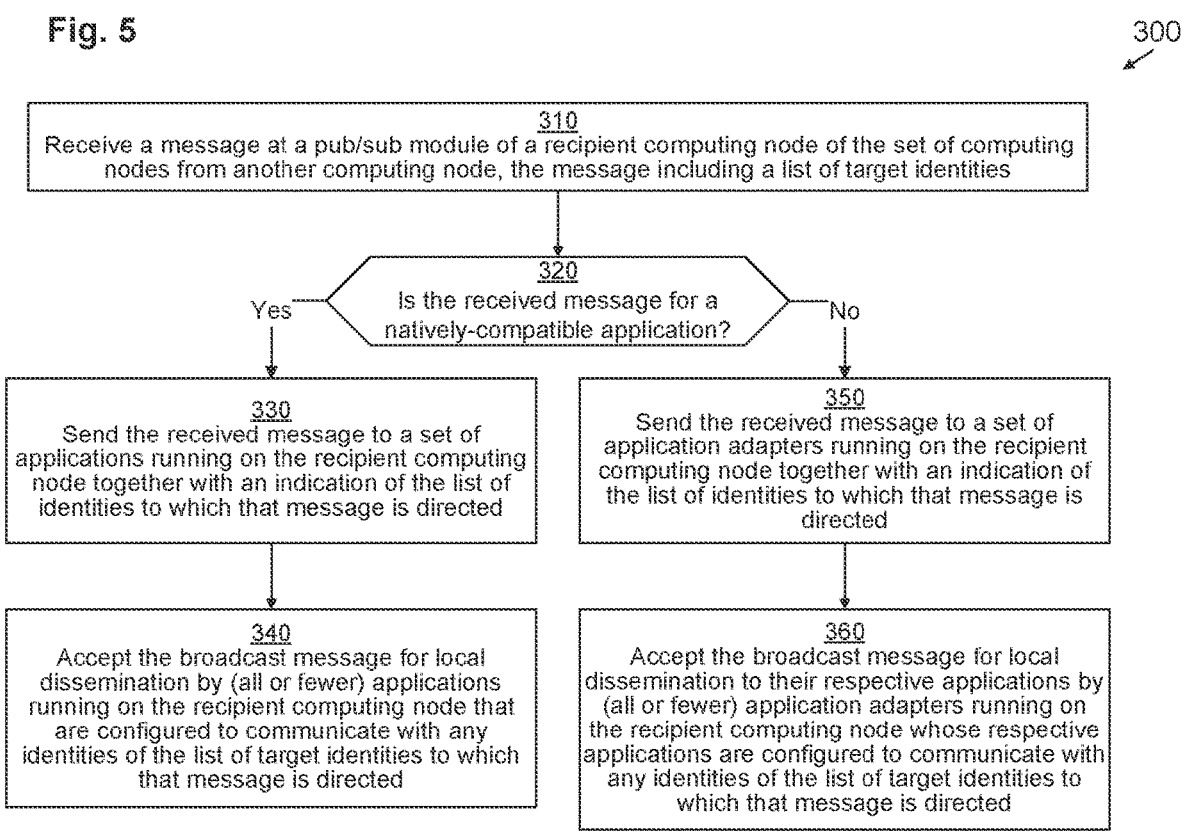

EFFICIENT DIRECTED CONTENT IN PUB/SUB SYSTEMS

GOVERNMENT RIGHTS

This invention was made with government support under Contract FA8750-19-C-0535 awarded by the Air Force Research Laboratory (AFRL). The government has certain rights in the invention.

BACKGROUND

Publish-Subscribe (Pub/Sub) messaging systems are used to allow publishers to publish content to subscribers. In Pub/Sub systems, subscribers subscribe to messages having particular topics (channels) or specified attributes, and publishers classify their outgoing messages by topic or attributes so that a Pub/Sub distribution service can evaluate messages against the subscriptions in order to determine which subscribers receive which messages.

SUMMARY

However, conventional Pub/Sub messaging systems may suffer from various deficiencies. For example, conventional Pub/Sub systems may need to evaluate large numbers of messages against a large number of subscriptions, which can lead to a high degree of computational complexity. Even if certain subscribers tend to receive messages from certain publishers, it is not efficient to set up narrow subscriptions from each subscriber to certain publishers.

Thus, it would be desirable for a messaging system to allow publishers that are aware of the identities of their respective subscribers to target content at those subscribers directly. This may be accomplished by allowing users and other targets (e.g., groups) to register their identities at particular computing nodes of a system. Then publishers (e.g., applications) may send out messages targeted at particular identities, and a publishing system may forward messages to appropriate nodes based on which identities are registered at those nodes. Legacy applications that are not able to target particular identities may instead connect to application adapters that are configured to learn which identities should be targeted by each application. In addition, anonymized identities may be used for application messages that need to cross between domains having differing security levels.

In one embodiment, a method of publishing content on a network is described. The method includes (a) maintaining a correspondence registry between a set of identities and a set of computing nodes of the network; and (b) in response to receiving a message at a first computing node of the set of computing nodes: (1) determining a list of identities to which that message is directed; (2) with reference to the list of identities and the correspondence registry, determining a subset of the set of computing nodes to which to direct the message; and (3) sending the message to the subset of the computing nodes. A system, apparatus, and computer program product for performing this method and similar methods are also described.

BRIEF DESCRIPTION OF THE DRAWINGS

The foregoing and other objects, features, and advantages will be apparent from the following description of particular embodiments, as illustrated in the accompanying drawings in which like reference characters refer to the same parts throughout the different views. The drawings are not necessarily to scale, emphasis instead being placed upon illustrating the principles of various embodiments of the invention.

FIG. 1 illustrates an example system and associated data structures for use in connection with identity registration according to one or more embodiments.

FIGS. 2A-2B illustrate an example system and example associated data structures for use in connection with message publication according to one or more embodiments.

FIG. 5 illustrates an example method in accordance with one or more embodiments.

DETAILED DESCRIPTION

Figure 3:
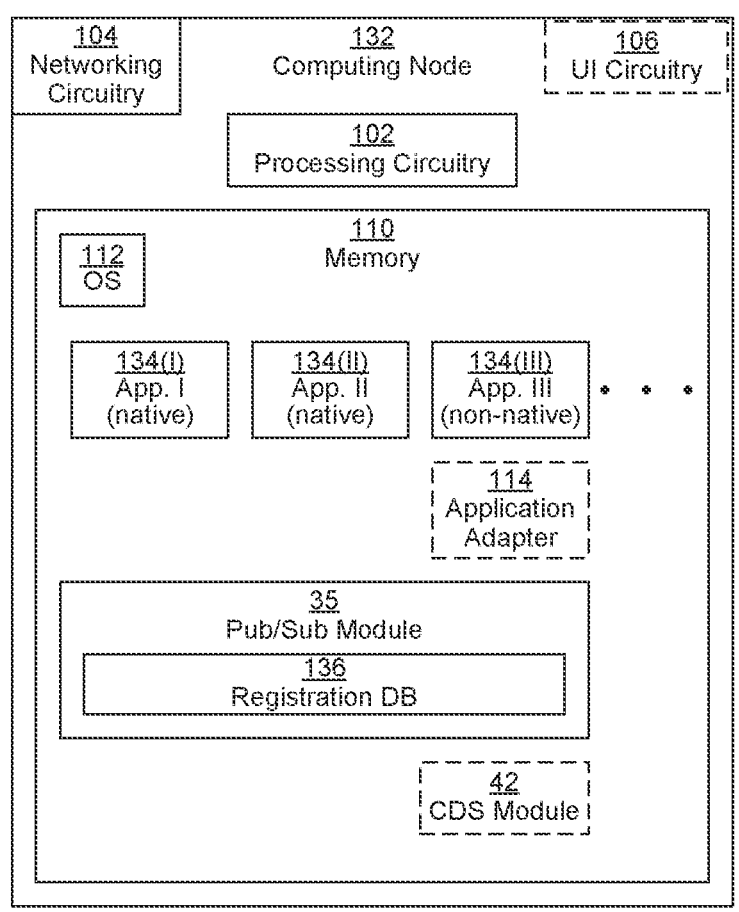
FIG. 3 illustrates an example apparatus and associated data structures in accordance with one or more embodiments.

Techniques are described herein for a messaging system to allow publishers that are aware of the identities of their respective subscribers to target content at those subscribers directly. This may be accomplished by allowing users and other targets (e.g., groups) to register their identities at particular computing nodes of a system. Then publishers (e.g., applications) may send out messages targeted at particular identities, and a publishing system may forward messages to appropriate nodes based on which identities are registered at those nodes. Legacy applications that are not able to target particular identities may instead connect to application adapters that are configured to learn which identities should be targeted by each application. In addition, anonymized identities may be used for application messages that need to cross between domains having differing security levels.

FIG. 1 illustrates an example system 30 during and after registration of identities. System 30 includes a plurality of computing nodes 32 (depicted as nodes 32(A)-32(G)) and at least one network 40. As depicted, there are two separate networks 40(1), 40(2), each associated with a distinct domain—domain 1 and domain 2, with domain 2 being highly-secure. Networks 40 may be any kinds of communications networks, such as, for example, a LAN, WAN, SAN, the Internet, a wireless communication network, a virtual network, a fabric of interconnected switches, etc.

As depicted, nodes 32(A), 32(B), 32(C), 32(D) are connected via network 40(1), while nodes 32(E), 32(F), 32(G) are connected via network 40(2). Nodes 32(D), 32(G) are connected to each other via a cross domain solution (CDS) running on each.

Each node 32 may run an application 34, and various users 38 may be connected to each node 32. As depicted application I 34(I) runs on nodes 32(A), 32(B), 32(C); application II 34(II) runs on nodes 32(A), 32(B), 32(C), 32(E); and application III 34(III) runs on nodes 32(B), 32(D), 32(F). A user 38 with a first identity (ID) 1 is connected to node 32(C) both via application 34(I) as user 38(1-I) and via application 34(II) as user 38(1-II). A user 38 with a second ID 2 is connected to node 32(B) via application 34(II) as user 38(2-II), to node 32(C) via application 34(I) as user 38(2-I), and to node 32(D) via application 34(III) as user 38(2-III). A user 38 with a third ID 3 is connected to node 32(B) both via application 34(I) as user 38(3-I) and via application 34(III) as user 38(3-III). A user 38 with a fourth ID 4 is connected to node 32(E) via application 34(II) as user 38(4-II) and to node 32(F) via application 34(III) as user 38(4-III). A user 38 with a fifth ID 5 is connected to node 32(F) via application 34(III) as user 38(5-III).

It should be understood that although IDs are depicted as relating to particular users 38, IDs may also represent other types of entities. An ID represents a set of one or more related entities such as, for example, different logins of a user, applications, groups of users, etc.

In operation, a Publish-Subscribe (Pub/Sub) module 35 running on computing node 32(C) broadcasts a registration message 50 to network 40(1) registering IDs 1 and 2 as being present on node C. Pub/Sub module 35 running on computing node 32(B) broadcasts a registration message 51 to network 40(1) registering IDs 2 and 3 as being present on node B.

At this point, a registration database (DB) 36(1) for domain 1 includes entries indicating that IDs 1 and 3 are registered to node B, that IDs 1 and 2 are registered to node C, and that ID 2 is registered to node D.

Pub/Sub module 35 running on computing node 32(D) broadcasts a registration message 52 to network 40(1) registering ID 2 as being present on node D. Pub/Sub module 35 running on computing node 32(E) broadcasts a registration message 53 to network 40(2) registering ID 4 as being present on node E. Pub/Sub module 35 running on computing node 32(F) broadcasts a registration message 54 to network 40(2) registering IDs 4 and 5 as being present on node F.

At this point, a registration DB 36(2) for domain 2 includes entries indicating that ID 4 is registered to node E and IDs 4 and 5 are registered to node F.

Because domain 2 is highly secure, while domain 1 is not, it would be a security risk to advertise IDs from domain 2 to domain 1, but there still may be a need to communicate between the domains. Therefore, a CDS module 42 running on computing node 32(G) may be configured to anonymize the IDs from the domain 2 registration DB 36(2) and to communicate with another CDS module 42 running on computing node 32(D) to register those anonymized IDs in domain 1. Thus, CDS module 42 running on computing node 32(G) sends an anonymized registration message 56 to CDS module 42 running on computing node 32(D) indicating that ID 4' (which is an anonymized version of ID 4) and ID 5' (which is an anonymized version of ID 5) are accessible via computing node 32(G). Then, Pub/Sub module 35 running on computing node 32(D) broadcasts a registration message 58 to network 40(1) registering IDs 4' and 5' as being accessible via node D. Now, registration DB 36(1) for domain 1 includes entries indicating that IDs 1 and 3 are registered to node B, that IDs 1 and 2 are registered to node C, and that IDs 2, 4', and 5' are registered to node D.

FIG. 2A shows another view of system 30 after the registration of FIG. 1 has been completed, while communications messages are being exchanged with reference to the registration DBs 36(1), 36(2). In step 60, application 34(I) sends a first communications message α to Pub/Sub module 35 running on computing node 32(A) indicating that the recipients of message α are IDs 1, 2, and 5'. In response, Pub/Sub module 35 on node A references its registration DB 36(1), finding that ID 1 is accessible via node C, ID 2 is accessible via nodes B, C, and D, and ID 5' is accessible via node D.

Note that ID 2 is accessible via multiple computing nodes 32. In some embodiments (type i), when an ID is accessible via more than one computing node 32, a message directed at that ID is sent to only one of those computing nodes 32. In another embodiment (type ii), when an ID is accessible via more than one computing node 32, a message directed at that ID is sent to all of those computing nodes 32. In another embodiment (type iii), when an ID is accessible via more than one computing node 32, a message directed at that ID is initially sent to only one of those computing nodes 32, but if no acknowledgment of receipt is made, then the message is resent to one or more of the other computing nodes 32 via which that ID is accessible. In some embodiments, the particular behavior (type I, ii, or iii) is determined by the particular application 34 that sent the initial message. FIG. 2A depicts an embodiment/application 34(I) that follows type ii.

In step 62, Pub/Sub module 35 on node A forwards message α to computing node 32(C) indicating that the recipients of message α are IDs 1 and 2. Upon receiving message α, Pub/Sub module 35 running on computing node 32(C) sends it to the locally-running applications 34(I), 34(II). Application 34(I) accepts message α so that it can display the message to users 38(14), 38(2-I). In some embodiments, if application 34(II) is compatible with application 34(I) (which originally sent message α in step 60), then application 34(II) may also accept message α so that it can display the message to user 38(1-II).

In step 63, Pub/Sub module 35 on node A forwards message α to computing node 32(C) indicating that the recipient of message α is ID 2. Upon receiving message α, Pub/Sub module 35 running on computing node 32(B) sends it to the locally-running applications 34(I), 34(II), 34(III). In some embodiments, if application 34(II) is compatible with application 34(I) (which originally sent message α in step 60), then application 34(II) may accept message α so that it can display the message to user 38(2-II).

In step 64, Pub/Sub module 35 on node A forwards message α to computing node 32(D) indicating that the recipients of message α are IDs 2 and 5'. Upon receiving message α, Pub/Sub module 35 running on computing node 32(B) sends it to the locally-running application 34(III) as well as locally-running CDS module 42. In some embodiments, if application 34(III) is compatible with application 34(I) (which originally sent message α in step 60), then application 34(III) may accept message α so that it can display the message to user 38(2-III). CDS module 42 running on computing node 32(D) accepts message α and, in step 66, forwards it to computing node 32(G).

CDS module 42 running on computing node 32(G) accepts message α, translates ID 5' to ID 5, and forwards the message to the locally-running Pub/Sub module 35. Since there are no locally-running applications 34, Pub/Sub module 35 proceeds to reference its registration DB 36(2), finding that ID 5 is accessible via node F. Then, in step 68, Pub/Sub module 35 on computing node 32(G) forwards message α to computing node 32(F) indicating that the recipient of message α is ID 5. Upon receiving message α, Pub/Sub module 35 running on computing node 32(F) sends it to the locally-running application 34(III). In some embodiments, if application 34(III) is compatible with application 34(I) (which originally sent message α in step 60), then application 34(III) may accept message α so that it can display the message to user 38(5-Ill).

FIG. 2B shows another view of system 30 after the registration of FIG. 1 has been completed, while communications messages are being exchanged with reference to the registration DBs 36(1), 36(2). In step 70, application 34(II) sends a second communications message β to Pub/Sub module 35 running on computing node 32(A) indicating that the recipients of message β are IDs 3 and 4'. In response, Pub/Sub module 35 on node A references its registration DB 36(1), finding that ID 3 is accessible via node B and ID 4' is accessible via node D.

In step 64, Pub/Sub module 35 on node A forwards message β to computing node 32(D) indicating that the recipient of message β is ID 4'. Upon receiving message β, Pub/Sub module 35 running on computing node 32(B) sends it to the locally-running application 34(III) as well as locally-running CDS module 42. CDS module 42 running on computing node 32(D) accepts message β and, in step 75, forwards it to computing node 32(G).

CDS module 42 running on computing node 32(G) accepts message β, translates ID 4' to ID 4, and forwards the message to the locally-running Pub/Sub module 35. Since there are no locally-running applications 34, Pub/Sub module 35 proceeds to reference its registration DB 36(2), finding that ID 4 is accessible via nodes E and F. Then, in step 77, Pub/Sub module 35 on computing node 32(G) forwards message β to computing node 32(E) indicating that the recipient of message β is ID 4. Upon receiving message β, Pub/Sub module 35 running on computing node 32(E) sends it to the locally-running application 34(II). Application 34(II) accepts message β so that it can display the message to user 38(4-II).

In step 78, Pub/Sub module 35 on computing node 32(G) forwards message β to computing node 32(F) indicating that the recipient of message β is ID 4. Upon receiving message β, Pub/Sub module 35 running on computing node 32(F) sends it to the locally-running application 34(III). In some embodiments, if application 34(III) is compatible with application 34(II) (which originally sent message β in step 70), then application 34(III) may accept message β so that it can display the message to user 38(4-III).

FIG. 3 depicts an example computing node 132 in more detail. Computing node 132 may be any kind of computing device, such as, for example, a personal computer, laptop, workstation, server, enterprise server, tablet, smartphone, etc. Computing node 132 includes processing circuitry 102, networking circuitry 104, and memory 110. In some embodiments, computing node 132 may also includes user interface (UI) circuitry 106 for connecting to a UI input device (not depicted) and a display device (not depicted). Computing node 132 may also include various additional features as is well-known in the art, such as, for example, interconnection buses, etc.

Processing circuitry 102 may include any kind of processor or set of processors configured to perform operations, such as, for example, a microprocessor, a multi-core microprocessor, a digital signal processor, a system on a chip (SoC), a collection of electronic circuits, a similar kind of controller, or any combination of the above.

Network interface circuitry 104 may include one or more Ethernet cards, cellular modems, Fibre Channel (FC) adapters, InfiniBand adapters, wireless networking adapters (e.g., Wi-Fi), and/or other devices for connecting to a network 40, such as, for example, a LAN, WAN, SAN, the Internet, a wireless communication network, a virtual network, a fabric of interconnected switches, etc.

UI circuitry 106 may include any circuitry needed to communicate with and connect to one or more user input devices and display screens. UI circuitry 106 may include, for example, a keyboard controller, a mouse controller, a touch controller, a serial bus port and controller, a universal serial bus (USB) port and controller, a wireless controller and antenna (e.g., Bluetooth), a graphics adapter and port, etc.

Memory 110 may include any kind of digital system memory, such as, for example, random access memory (RAM). Memory 110 stores an operating system (OS) 112 (e.g., a Linux, UNIX, Windows, MacOS, or similar operating system) and various drivers and other applications and software modules configured to execute o processing circuitry 102.

Memory 110 stores a set of applications 134 and a Pub/Sub module 35, which are configured to execute on processing circuitry 110. In some arrangements, memory 110 may also store an application adapter 114 and/or a CDS module 42, which are also configured to execute on processing circuitry 110.

Some of the applications 134 may be applications that natively support identity-based messaging. For example, as depicted, applications 134(I), 134(II) natively support identity-based messaging. Other applications 134 may be legacy applications that do not natively support identity-based messaging. For example, as depicted, application 134(III) does not natively support identity-based messaging. Since application 134(III) does not natively support identity-based messaging, application 134(III) may communicate with Pub/Sub module 35 via application adapter 114. Application adapter 114 may be configured to determine which IDs messages from application 134(III) ought to be directed towards. This may be accomplished using machine learning techniques. Application adapter 114 may also be configured to receive messages from Pub/Sub module 35 on behalf of one or more non-native applications 134 (e.g., application 134(III)).

Memory 110 may also store various other data structures used by the OS 112, applications 134, modules 35, 42, 114 and various other applications and drivers. In some embodiments, memory 110 may also include a persistent storage portion. Persistent storage portion of memory 110 may be made up of one or more persistent storage devices, such as, for example, magnetic disks, flash drives, solid-state storage drives, or other types of storage drives. Persistent storage portion of memory 110 is configured to store programs and data even while the computing node 132 powered off. The OS, modules 52, 60 and various other applications and drivers are typically stored in this persistent storage portion of memory 110 so that they may be loaded into a system portion of memory 110 upon a system restart or as needed. The OS 112, applications 134, modules 35, 42, 114 and various other applications and drivers, when stored in non-transitory form either in the volatile or persistent portion of memory 110, each form a computer program product. The processing circuitry 102 running one or more applications thus forms a specialized circuit constructed and arranged to carry out the various processes described herein.

Figure 4:
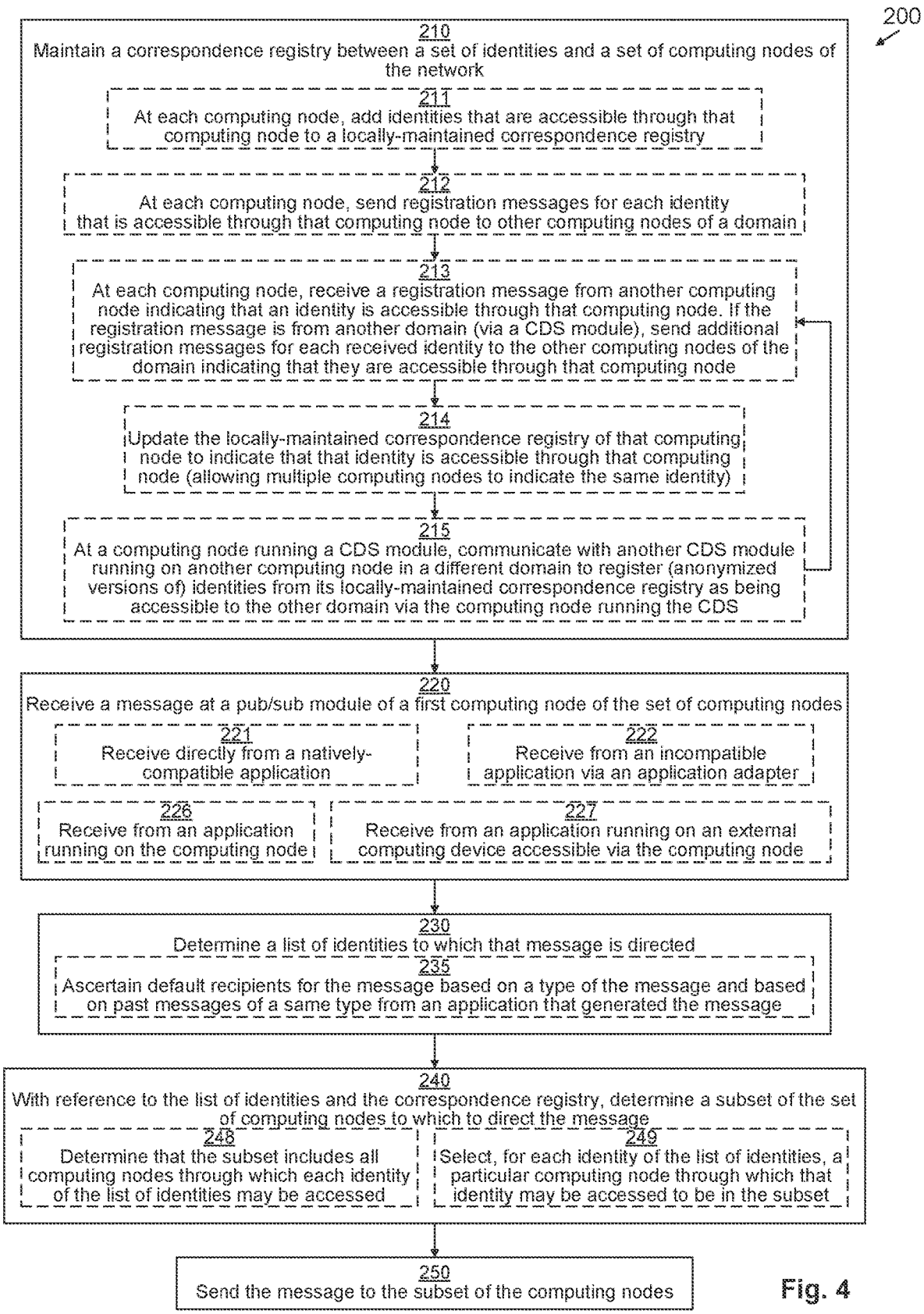
FIG. 4 illustrates an example method in accordance with one or more embodiments.

FIG. 4 illustrates an example method 200 performed by a system 30 for publishing content on a network 40. It should be understood that any time a piece of software (e.g., OS 112, applications 134, modules 35, 42, 114, etc.) is described as performing a method, process, step, or function, what is meant is that a computing device (e.g., computing node 32, 132) on which that piece of software is running performs the method, process, step, or function when executing that piece of software on its processing circuitry 102. It should be understood that one or more of the steps or sub-steps of method 200 may be omitted in some embodiments. Similarly, in some embodiments, one or more steps or sub-steps may be combined together or performed in a different order. Dashed lines indicate that a step or sub-step is either optional or representative of alternate embodiments or use cases.

In step 210, system 30 maintains a correspondence registry (e.g., a registration DB 36) between a set of IDs and a set of computing nodes 32 of a network 40. In some embodiments, step 210 may include sub-steps 211-215.

In sub-step 211, each computing node 32(X) adds IDs that are accessible through that computing node 32(X) to a locally-maintained correspondence registry (e.g., registration DB 36 stored on that computing node 32(X)). For example, in the context of FIG. 1, Pub/Sub module 35 running on computing node 32(B) adds IDs 2 and 3 to Node B within a copy of registration DB 36(1) stored on computing node 32(B). Similarly, Pub/Sub module 35 running on computing node 32(C) adds IDs 1 and 2 to Node C within a copy of registration DB 36(1) stored on computing node 32(C), and Pub/Sub module 35 running on computing node 32(D) adds ID 2 to Node D within a copy of registration DB 36(1) stored on computing node 32(D). Since no IDs access computing node 32(A) directly, computing node 32(A) does not perform sub-step 211.

In sub-step 212, each computing node 32(X) sends registration messages for each ID that is accessible through that computing node 32(X) to other computing nodes 32 of a domain. In some embodiments, this may include broadcasting a registration messages to a network 40 of which that computing node 32(X) is a member. For example, in the context of FIG. 1, Pub/Sub module 35 running on computing node 32(B) broadcasts registration message 51 to network 40(1) indicating that IDs 2 and 3 are accessible via Node B. Similarly, Pub/Sub module 35 running on computing node 32(C) broadcasts registration message 51 to network 40(1) indicating that IDs 1 and 2 are accessible via Node C, and Pub/Sub module 35 running on computing node 32(D) broadcasts registration message 52 to network 40(1) indicating that ID 2 is accessible via Node D. Since no IDs access computing node 32(A) directly, computing node 32(A) does not perform sub-step 212.

In sub-step 213, each computing node 32(X) on a network 40 receives a registration message from one or more other computing nodes 32(Y) indicating that an ID is accessible through that other computing node 32(Y). If the registration message is from another domain (e.g., via a CDS module 42), then that computing node 32(X) sends additional registration messages for each received (via CDS module 42) ID to other computing nodes 32 of its domain. For example, in the context of FIG. 1, Pub/Sub module 35 running on computing node 32(B) receives registration messages 50, 52 from network 40(1). As another example, Pub/Sub module 35 running on computing node 32(D) receives registration messages 50, 51 from network 40(1) and registration message 56 from CDS module 42 running on computing node 32(G) via local CDS module 42; Pub/Sub module 35 running on computing node 32(D) proceeds to broadcast additional registration message 58 to network 40(1) indicating that IDs 4' and 5' are accessible via Node D.

In sub-step 214, each computing node 32(X) on a network 40 updates its locally-maintained correspondence registry (e.g., registration DB 36 stored on that computing node 32(X)) to indicate that the IDs of each registration message received in step 213 are accessible through the computing node 32(Y) from which that registration message was received. For example, in the context of FIG. 1, Pub/Sub module 35 running on computing node 32(B) updates its local registration DB 36(1) to add that IDs 1 and 2 are accessible via node C (as indicated by registration message 50 received from computing node 32(C)) and to add that ID 2 is accessible via node D (as indicated by registration message 52 received from computing node 32(D)). As another example, Pub/Sub module 35 running on computing node 32(D) updates its local registration DB 36(1) to add that IDs 1 and 2 are accessible via node C (as indicated by registration message 50 received from computing node 32(C)), to add that IDs 2 and 3 are accessible via node B (as indicated by registration message 51 received from computing node 32(B)), and to add that IDs 4' and 5' are accessible via node D (as indicated by registration message 56 received from its local CDS module 42) (in addition to ID 2 being accessible via node D, which was already added to its local registration DB 36(1) in sub-step 211).

In sub-step 215, if a computing node 32(X) is running a CDS module 42 that is in communication with another CDS module 42 running on another computing node 32(Y) on another network 40, then, the computing node 32(X) communicates with the other CDS module 42 running on the other computing node 32(Y) to register the IDs from the first computing node's locally-maintained correspondence registry as being accessible to the other domain via the other computing node 32(Y). In some embodiments and arrangements (e.g., if the domain of the other computing node 32(Y) is more highly secure than that of the first computing node 32(X)), then the computing node 32(X) may anonymize its IDs prior to communicating them to the other computing node 32(Y). For example, with reference to FIG. 1, CDS module 42 of computing node 32(G) anonymizes the IDs 4, 5 listed in the registration DB 36(2) for network 40(2) and communicates those anonymized IDs 4', 5' to computing node 32(D) in message 56.

In response to sub-step 215, sub-steps 213-214 may be repeated at a computing node 32 that receives communications via its CDS module 42. Thus, for example, with reference to FIG. 1, after the CDS module 42 of computing node 32(G) sends anonymized cross-domain registration message 56 to the CDS module 42 of computing node 32(D), computing node 32(D) performs sub-steps 213, 214 with respect to the anonymized IDs 4', 5', as described above.

In step 220, a Pub/Sub module 35 of an initiating computing node 32(X) receives a message for distribution. In any given instance, step 220 may include one of sub-steps 221, 222. In sub-step 221, the Pub/Sub module 35 receives the message directly from a natively-compatible application 34, 134 (e.g., application 134(I), 134(II)). In sub-step 222, the Pub/Sub module 35 receives the message indirectly from an incompatible application 34, 134 (e.g., application 134(III)) via an application adapter 114.

In any given instance, step 220 may include one of sub-steps 226, 227. In sub-step 226, the Pub/Sub module 35 receives the message (either directly or indirectly) from an application 34, 134 that is running on the computing node 32(X) itself. In sub-step 227, the Pub/Sub module 35 receives the message (either directly or indirectly) from an application 34, 134 that is running on another computing device external to the computing node 32(X), the application being accessible through the computing node 32(X).

An example of step 220 may be seen in the sending of first communications message α from application 34(I) to Pub/Sub module 35 running on computing node 32(A) in step 60 of FIG. 2A. Another example of step 220 may be seen in the sending of second communications message β from application 34(II) to Pub/Sub module 35 running on computing node 32(A) in step 70 of FIG. 2B.

In step 230, the Pub/Sub module 35 of the initiating computing node 32(X) determines a list of the IDs to which the message (e.g., message α or β) is directed. This may include examining metadata included within the message indicating the recipient IDs. For example, in the context of FIG. 2A, the metadata of message α indicates that the recipients are IDs 1, 2, and 5'.

In some situations, step 230 may include sub-step 235. In sub-step 235, an application adapter 114 for an incompatible application 34, 134 may ascertain default recipients for the message based on a type of a message and also based on past messages of a same type from the application 34, 134 (or a similar application) that generated the message. It should be understood that an application 34, 134 (whether natively compatible or incompatible with the improvements discussed herein) may also send messages using traditional Pub/Sub techniques based on subscriber lists. The application adapter 114 may learn from such previous traditional Pub/Sub messages or from other messages sent without using Pub/Sub what the appropriate recipient IDs ought to be.

In step 240, the Pub/Sub module 35 determines which computing nodes 32 on its network 40 to send the message (from step 22) to, with reference to the list of target IDs (from step 230) and the correspondence registry (e.g., registration DB 36). Depending on the embodiment, step 240 may include either sub-step 248 or 249.

In sub-step 248, Pub/Sub module 35 determines that the list of recipient computing nodes 32 includes all computing nodes 32 through which an ID may be accessed. For example, with reference to FIG. 2A, Pub/Sub module 35 on computing node 32(A) references its registration DB 36(1) to determine which nodes may be used to access IDs 1, 2, and 5' (the IDs determined in step 230). With specific reference to ID 2, Pub/Sub module 35 selects all three of nodes B, C, D since all of those are listed in connection with ID 2, even though ID 2 is accessible multiple computing nodes 32.

In sub-step 249, Pub/Sub module 35 selects a particular computing node 32 for each ID through which that ID may be accessed. For example, with reference to FIG. 2A, Pub/Sub module 35 on computing node 32(A) references its registration DB 36(1) to determine which nodes may be used to access IDs 1, 2, and 5' (the IDs determined in step 230). With specific reference to ID 2, Pub/Sub module 35 selects only a particular one of nodes B, C, D in order to avoid redundancy.

As another example of step 240, with reference to FIG. 2B, Pub/Sub module 35 on computing node 32(A) references its registration DB 36(1) to determine which nodes may be used to access IDs 3 and 4' (the IDs determined in step 230). Pub/Sub module 35 on computing node 32(A) will select nodes B, D since those are listed in connection with the IDs determined in step 230.

In step 250, the Pub/Sub module 35 sends the message received in step 220 to the list of computing nodes 32 on its network 40 that it selected in step 240, together with the list of target IDs.

FIG. 5 illustrates an example method 300 performed by a particular computing node 32(Y) in receipt of a message.

In step 310, the recipient computing node 32(Y) receives a message at its Pub/Sub module 35 from another computing node 32(X), the message including a list of target IDs. For example, with reference to FIG. 2A, Pub/Sub module 35 on computing node 32(C) receives message 62 from computing node 32(A) with metadata indicating that the target IDs are IDs 1 and 2.

In step 320, the Pub/Sub module 35 on computing node 32(Y) determines whether the received message is directed toward a natively-compatible application. If so, operation proceeds with step 330; otherwise, operation proceeds with step 350. For example, with reference to FIG. 2A, Pub/Sub module 35 on computing node 32(C) may determine that message 62 was sent from application 34(I) and that that application 34(I) is natively-compatible.

It should be understood that step 320 may have different results for different IDs. For example, with reference to FIG. 1, suppose that natively-compatible application 34(II) had sent a message γ with target IDs 2, 3, and Pub/Sub module 35 on computing node 32(A) had forwarded that message to computing node 32(B) with metadata indicating the source is application 34(II) and the targets are IDs 2, 3. In step 320, Pub/Sub module 35 on computing node 32(B) may determine with respect to ID 2 that since application 34(II) may be used to convey the message to user 38(2-II), the received message is directed toward a natively-compatible application 34(II), so operation proceeds with step 330 for ID 2. However, with respect to ID 2, there is no user 38 with ID 3 logged into application 34(II). If, non-native application 34(III) is compatible with application 34(II) (especially if native application 34(I) is not compatible with application 34(II)), then, application 34(III) may be used to convey the message to user 38(3-III). Since application 34(III) is not natively-compatible with the improved Pub/Sub system, Pub/Sub module 35 on computing node 32(B) may determine with respect to ID 3 that the received message is directed toward a natively-compatible application, so operation proceeds with step 350 for ID 3.

In step 330, Pub/Sub module 35 on computing node 32(Y) sends the received message to one or more natively-compatible applications 34, 134 through which one or more of the target IDs may be accessed. In some embodiments, this step may include publishing the received message to a memory location of computing node 32(Y) that the natively-compatible applications 34, 134 running on computing node 32(Y) are configured to poll together with an indication of the target IDs. Then, in step 340, any natively-compatible applications 34, 134 through which users 38 with any of the target IDs are logged-in may accept the received message for local dissemination to the users 38 with any of the target IDs via those natively-compatible applications.

For example, in the context of FIG. 2A, in step 330, computing node 32(C) may publish the received message α to a location accessible to its natively-compatible applications 34, 134 (i.e., applications 34(I), 34(II)) indicating target IDs 1, 2. Then, in step 340, application 34(I) may accept message α and disseminate it to users 38(14), 38(2-I). In principle, application 34(II) might also accept message α and disseminate it to user 38(1-II), but only if application 34(II) is compatible with application 34(I) (which originally sent message α).

As another example, in the context of example message γ, in step 330, computing node 32(C) may publish the received message γ to a location accessible to its natively-compatible applications 34, 134 (i.e., applications 34(I), 34(II)) indicating target ID 2. Then, in step 340, application 34(II) may accept message γ and disseminate it to user 38(2-II).

In step 350, Pub/Sub module 35 on computing node 32(Y) indirectly sends the received message to one or more natively-compatible applications 34, 134 through which one or more of the target IDs may be accessed via one or more application adapters 114. In some embodiments, this step may include publishing the received message to a memory location of computing node 32(Y) that the application adapters 114 running on computing node 32(Y) are configured to poll together with an indication of the target IDs. Then, in step 360, any application adapters 114 associated with any natively-incompatible applications 34, 134 through which users 38 with any of the target IDs are logged-in may accept the received message for local dissemination to the users 38 with any of the target IDs via those natively-incompatible applications.

For example, in the context of example message γ, in step 350, computing node 32(B) may publish the received message γ to a location accessible to its natively-incompatible applications 34, 134 (i.e., application 34(III)) indicating target ID 3. Then, in step 360, application adapter 114 for application 34(III) may accept message γ and disseminate it to user 38(3-III) via application 34(III).

It should be understood that in some embodiments, instead of there being an explicit decision step 320 followed by two different operational paths (330-340 and 350-360), these paths may be unified. For example, Pub/Sub module 35 on computing node 32(Y) may publish the received message to a memory location of computing node 32(Y) that is polled BOTH by the natively-compatible applications 34, 134 and by the application adapters 114.

Although not depicted in FIG. 5, it should be understood that in the event that a message (e.g., message α or β) is directed towards a computing node 32 (e.g., computing node 32(E) or 32(F)) that is in a different domain, when it is received by a computing node 32 (e.g., computing node 32(D)) that is running a CDS module 42 configured to communicate with the other domain, that computing node 32 will forward the message to the other domain via the CDS module 42 if the recipient list includes IDs that are accessible through the CDS module 42.

Thus, techniques have been described for a messaging system to allow publishers that are aware of the identities of their respective subscribers to target content at those subscribers directly. This may be accomplished by allowing users 38 and other targets (e.g., groups) to register their identities at particular computing nodes 32 of a system 30. Then publishers (e.g., applications 34, 134) may send out messages targeted at particular identities, and a publishing system may forward messages to appropriate nodes 32 based on which identities are registered at those nodes 32. Legacy applications that are not able to target particular identities may instead connect to application adapters 114 that are configured to learn which identities should be targeted by each application 34, 134. In addition, anonymized identities may be used for application messages that need to cross between domains having differing security levels.

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "background" or as "conventional," Applicant makes no admission that such technique, method, apparatus, or other concept is actually prior art under 35 U.S.C. § 102 or 103, such determination being a legal determination that depends upon many factors, not all of which are known to Applicant at this time.

What is claimed is:

1. A method of publishing content on a network via a Publish-Subscribe (Pub/Sub) enabled application, the method comprising:
maintaining a correspondence registry between a set of identities and a set of computing nodes of the network; and
in response to receiving a message at a first computing node of the set of computing nodes:
determining a list of identities to which the message is directed;
with reference to the list of identities and the correspondence registry,
determining a subset of the set of computing nodes to which to direct the message; and
sending the message from the first computing node to the subset of the computing nodes;
wherein maintaining the correspondence registry includes:
receiving a registration message from a second computing node indicating that an identity is accessible through the second computing node; and
in response to receiving the registration message, updating the correspondence registry to indicate that that identity is accessible through the second computing node;
wherein an identity represents a set of one or more related entities;
wherein:
receiving the registration message from the second computing node indicating that the identity is accessible through the second computing node includes receiving a first message from the second computing node indicating that a first entity of the identity is accessible through the second computing node;
maintaining the correspondence registry further includes:
receiving a second message from a third computing node indicating that a second entity of the identity is accessible through the third computing node; and
in response to receiving the second message, updating the correspondence registry to indicate that identity is also accessible through the third computing node.

2. The method of claim 1 wherein determining the list of identities includes receiving the list of identities from an application that generated the message.

3. The method of claim 1 wherein determining the list of identities includes ascertaining default recipients for the message based on a type of the message and based on past messages of a same type from an application that generated the message.

4. The method of claim 1 wherein the set of one or more related entities includes a person.

5. The method of claim 1 wherein the set of one or more related entities includes a non-person entity.

6. The method of claim 1 wherein determining the subset of the set of computing nodes to which to direct the message includes determining that the subset includes all computing nodes through which each identity of the list of identities may be accessed.

7. The method of claim 1 wherein determining the subset of the set of computing nodes to which to direct the message includes selecting, for each identity of the list of identities, a particular computing node through which that identity may be accessed to be in the subset.

8. The method of claim 1 wherein the method further comprises, after sending the message to the subset of the computing nodes, at a first recipient node of the subset of the computing nodes, in response to receiving the message from the first computing node:
   sending the received message to a set of applications running on the first recipient node together with an indication of the list of identities to which that message is directed; and
   applications running on the recipient node configured to communicate with any identities of the list of identities to which that message is directed accepting the message for local dissemination.

9. The method of claim 1 wherein the method further comprises, after sending the message to the subset of the computing nodes, at a first recipient node of the subset of the computing nodes, in response to receiving the message from the first computing node:
   sending the received message to a set of application adapters running on the first recipient node together with an indication of the list of identities to which that message is directed; and
   application adapters associated with applications running on the recipient node configured to communicate with any identities of the list of identities to which that message is directed accepting the message for local dissemination.

10. The method of claim 1 wherein maintaining the correspondence registry further includes:
    at the second computing node, receiving another registration message from a third computing node on a different network indicating that the identity is accessible on the different network through the third computing node; and
    in response to receiving the other registration message from the third computing node on the different network, sending the registration message from the second computing node to the network.

11. The method of claim 10 wherein:
    the identity is an anonymized version of another identity present on the different network;
    determining the list of identities to which that message is directed in response to receiving the message includes determining that the list of identities includes the identity accessible through the second computing node;
    sending the message from the first computing node to the subset of the computing nodes includes sending the message to the second computing node with an indication of the identity; and
    the method further comprises:
    in response to receiving the message at the second computing node, forwarding the message to the third computing node;
    in response to receiving the message at the third computing node, determining, by the third computing node, that the identity represents the other identity;
    with reference to another correspondence registry maintained at the third computing node, determining another set of computing nodes of the different network to which to direct the message; and
    sending the message from the third computing node to the other set of the computing nodes of the different network.

12. The method of claim 1 wherein the method further comprises:
    maintaining a Pub/Sub feature that indicates subscriptions by computing nodes of the network; and
    in response to receiving another message at the first computing node:
    with reference to the subscriptions indicated by the Pub/Sub feature, determining another subset of the set of computing nodes to which to direct the other message; and
    sending the other message from the first computing node to the other subset of the computing nodes.

13. A computer program product comprising a non-transitory computer-readable storage medium storing a set of instructions, which, when executed by a computing device, cause the computing device to perform a method of publishing content on a network via a Publish-Subscribe (Pub/Sub) enabled application as recited in claim 1.

14. A system for publishing content on a network via a Publish-Subscribe (Pub/Sub) enabled application, the system comprising:
    a first computing node on the network; and
    a set of additional computing nodes on the network;
    wherein the network is configured to maintain a correspondence registry between a set of identities and the set of additional computing nodes; and
    wherein the first computing node is configured to, in response to receiving a message:
    determine a list of identities to which the message is directed;
    with reference to the list of identities and the correspondence registry, determine a subset of the set of additional computing nodes to which to direct the message; and
    send the message from the first computing node to the subset of the additional computing nodes;
    wherein maintaining the correspondence registry includes:
    receiving a registration message from a second computing node indicating that an identity is accessible through the second computing node; and
    in response to receiving the registration message, updating the correspondence registry to indicate that that identity is accessible through the second computing node;
    wherein an identity represents a set of one or more related entities;
    wherein:
    receiving the registration message from the second computing node indicating that the identity is accessible through the second computing node includes receiving a first message from the second computing node indicating that a first entity of the identity is accessible through the second computing node;
    maintaining the correspondence registry further includes:
    receiving a second message from a third computing node indicating that a second entity of the identity is accessible through the third computing node; and
    in response to receiving the second message, updating the correspondence registry to indicate that identity is also accessible through the third computing node.

* * * * *